United States Patent
Kinoshita

(10) Patent No.: US 7,890,838 B2
(45) Date of Patent: Feb. 15, 2011

(54) STORAGE APPARATUS HAVING NONVOLATILE STORAGE MODULE

(75) Inventor: Tadaaki Kinoshita, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/605,816

(22) Filed: Oct. 26, 2009

(65) Prior Publication Data

US 2010/0162080 A1 Jun. 24, 2010

(30) Foreign Application Priority Data

Dec. 19, 2008 (JP) .............................. 2008-324328

(51) Int. Cl.
*G11C 29/00* (2006.01)

(52) U.S. Cl. .................................... 714/764
(58) Field of Classification Search ................ 714/755, 714/763–764, 769
See application file for complete search history.

(56) References Cited

U.S. PATENT DOCUMENTS

| | | | |
|---|---|---|---|
| 5,892,705 A | 4/1999 | Chung | |
| 6,941,413 B2 | 9/2005 | Baba | |
| 7,168,026 B2 * | 1/2007 | Garney et al. | 714/765 |
| 7,203,886 B2 * | 4/2007 | Brown et al. | 714/758 |
| 7,325,157 B2 * | 1/2008 | Sesek et al. | 714/8 |
| 7,408,824 B2 * | 8/2008 | Hoya et al. | 365/200 |

FOREIGN PATENT DOCUMENTS

| | | |
|---|---|---|
| JP | 7-73682 | 3/1995 |
| JP | 10-69790 | 3/1998 |
| JP | 2003-100088 | 4/2003 |
| JP | 2003-196165 | 7/2003 |
| JP | 2005-135488 | 5/2005 |
| JP | 2005-522811 | 7/2005 |
| JP | 2006-085847 | 3/2006 |
| JP | 2007-4284 | 1/2007 |

OTHER PUBLICATIONS

Japanese Office Action dated Jan. 19, 2010, Japanese Patent Application No. 2008-324328.

* cited by examiner

*Primary Examiner*—Shelly A Chase
(74) *Attorney, Agent, or Firm*—Patterson & Sheridan, LLP

(57) ABSTRACT

According to one embodiment, a storage apparatus includes a first nonvolatile storage module, a second nonvolatile storage module, and an error checking and correction module. The first nonvolatile storage module undergoes a destructive read when data is read from it. The second nonvolatile storage module stores the address data representing the storage location in the first nonvolatile storage module at which data to be read is stored. The error checking and correction module checks for and corrects an error in the data stored at the storage location in the first nonvolatile storage module which is represented by the address data stored. The error checking and correction module writes the corrected data back into the first nonvolatile storage module.

13 Claims, 9 Drawing Sheets

STORAGE APPARATUS HAVING NONVOLATILE STORAGE MODULE

CROSS-REFERENCE TO RELATED APPLICATIONS

This application is based upon and claims the benefit of priority from Japanese Patent Application No. 2008-324328, filed Dec. 19, 2008, the entire contents of which are incorporated herein by reference.

BACKGROUND

1. Field

One embodiment of the invention relates to a storage apparatus having a nonvolatile storage module, and more particularly to a storage apparatus having a storage module that is configured to undergo a destructive read when data is read from it.

2. Description of the Related Art

Ferroelectric RAMs (FeRAMs), such as those of the 1T1C and 1T types, are known as nonvolatile memories (or nonvolatile storage modules) that undergo a destructive read when data is read from them. Most storage apparatuses having such a nonvolatile memory have a mechanism for writing data, once read, back into the nonvolatile memory. This mechanism can therefore prevent loss of the data stored in the nonvolatile memory in spite of the destructive read.

However, if the supply of power to the storage apparatus is interrupted while the data is being read from the apparatus, at least a part of the data may be corrupted, as is described in, for example, Jpn. Pat. Appln. KOKAI Publication No. 10-069790 (hereinafter referred to as Prior Art Document 1).

In view of this, conventional storage apparatuses are configured to check for data corruption resulting from the interruption of the supply of power based on error checking and correction (ECC) data that accompanies the data being read from the storage apparatus. If the storage apparatus detects a data error, it will correct the data.

However, in the conventional storage apparatus of this type, that part of the data corrupted by the interruption of power supply remains corrupt in the nonvolatile memory until an access is made to the data including the corrupt part. Inevitably, many corrupt data parts may exist in the nonvolatile memory if the supply of power is unexpectedly interrupted repeatedly. Further, the data-error check must be performed every time data is read from the nonvolatile memory. This increases the power consumption of the storage apparatus and delays the data transfer by the time required for the error check.

Prior Art Document 1 discloses a mechanism in which a control portion completes the writeback cycle of writing the data, once read, back into the nonvolatile memory (FeRAM), before a failure in power source voltage (power failure). In this mechanism, a power-source voltage sensing portion senses a power failure beforehand, thereby achieving the completion of the writeback cycle.

Jpn. Pat. Appln. KOKAI Publication No. 07-073682 (hereinafter referred to as Prior Art Document 2) discloses a save memory SM for temporarily store the data held in the ferroelectric capacitors of a nonvolatile memory (FeRAM), which should be forcedly refreshed. This save memory SM comprises ferroelectric capacitors. Prior Art Document 2 further discloses a mechanism that copies the data held in the ferroelectric capacitors to be forcedly refreshed and then temporarily holds the data, thus copied, in the save memory SM.

The FeRAMs of 2T2C type known in the art have a hardware configuration that does not undergo destructive read when data is read.

To provide such mechanisms as described in Prior Art Document 1 or 2, a nonvolatile storage module need to have a special hardware configuration. Further, any FeRAM of 2T2C type (i.e., nonvolatile storage module that undergoes no destructive read when data is read from it) needs to incorporate a special hardware configuration, too.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, a storage apparatus is provided. This storage apparatus comprises: a first nonvolatile storage module configured to undergo a destructive read when data is read; a second nonvolatile storage module configured to store address data representing a storage location in the first nonvolatile storage module at which data to be read is stored; and an error checking and correction module configured to check for and correct an error in data stored at the storage location in the first nonvolatile storage module which is represented by the address data stored in the second nonvolatile storage module, and configured to write the corrected data back into the first nonvolatile storage module.

Figure 1:
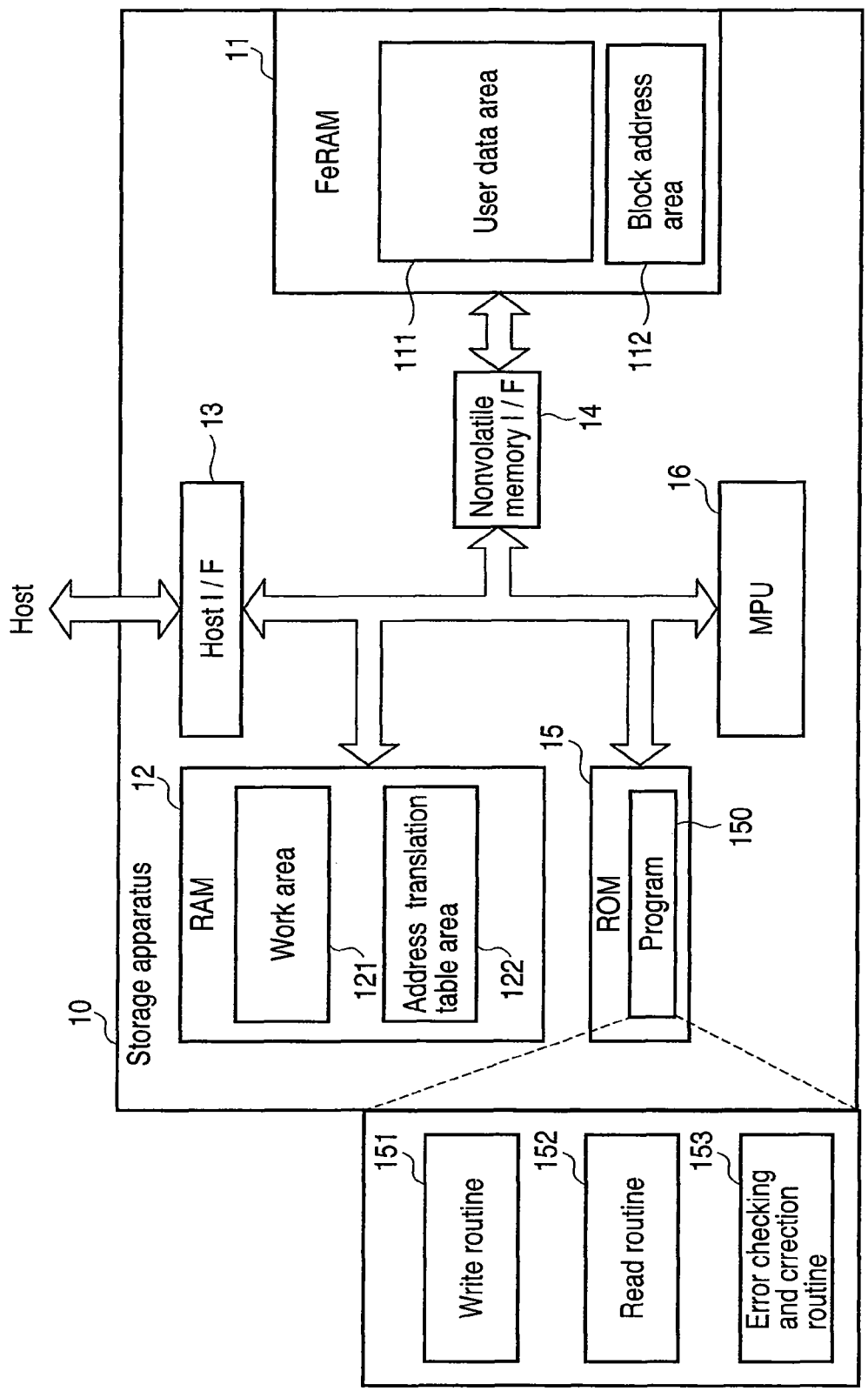
FIG. 1 is a block diagram showing an exemplary configuration of a storage apparatus according to an embodiment of the invention.

FIG. 1 is a block diagram showing an exemplary configuration of a storage apparatus according to an embodiment of the invention. As shown in FIG. 1, the storage apparatus 10 includes a ferroelectric RAM (FeRAM) 11, a RAM 12, a host interface 13, a nonvolatile memory interface 14, a ROM 15, and a microprocessor unit (MPU) 16.

The FeRAM 11 is a nonvolatile memory (first nonvolatile storage module), such as FeRAM of 1T1C type or FeRAM of 1T type, which comprises a group of memory cells that undergo a destructive read when data is read from them. That is, the FeRAM 11 is used as a first nonvolatile storage module (nonvolatile storage device) that is configured to undergo a destructive read when data is read from it. The memory cells have a ferroelectric capacitor each, which undergoes the destructive read.

The storage area of the FeRAM 11 is divided into a plurality of blocks (physical blocks) 20 (see FIG. 2), which are managed independently of one another. In other words, the FeRAM 11 is managed in units of block 20. The FeRAM 11 has a mechanism of the known type that writes the data, once read, back into the FeRAM 11, thereby preventing the data held in the FeRAM 11 from being lost, in spite of the destructive read.

A part of the storage area of the FeRAM 11 is used as a user data area 111. The user data area 111 is used to store user data. Another part of the storage area of the FeRAM 11 is used as a block address area 112. The block address area 112 is used as a second nonvolatile storage module that temporarily saves block address data when the user data is read from the user data area 111. The block address data represents the block address (physical block address) of any block 20 (see FIG. 2) that stores the user data.

The RAM 12 is a volatile memory. A part of the storage area of the RAM 12 is used as a work area 121 that the MPU 16 uses to perform an error checking process. Another part of the storage area of the RAM 12 is used as an address translation table area 122.

The address translation table area 122 is used to store an address translation table that is necessary in translating, for example, the logic address (logic block address) designated by a host, to a physical address (physical block address). The address translation table holds logic block addresses and physical block addresses associated with the logic block addresses. The physical block addresses pertain to the physical blocks allocated to the logic blocks designated by the logic addresses. In this embodiment, the address translation table has been generated in the RAM 12 during the initialization process performed in the storage apparatus 10. Various methods of generating the address translation table have been known. For example, the address translation table is first stored in a nonvolatile memory and then loaded into the RAM 12 as needed. Alternatively, the address translation table may be generated by any other method, for example, by using ROM data. Note that the address translation table need not be used in a system wherein the host directly designates physical addresses (physical block addresses).

The host interface 13 is an interface between the host and the storage apparatus 10. The host is an electronic device, such as a personal computer, which utilizes the storage apparatus 10. When the host transfers a command, the host interface 13 receives the command and transfers the same to the MPU 16. The nonvolatile memory interface 14 is an interface through which the MPU 16 accesses the FeRAM 11.

The ROM 15 stores a program 150 that should be executed by the MPU 16. The program 150 is, for example, a firmware program that includes a write routine 151, a read routine 152, and an error checking and correction routine 153.

The write routine 151 includes a process of generating error checking and correction (ECC) data when the host interface 13 receives from the host the user data (i.e., user data the write command designates). The ECC data is used to check for and correct an error, if any, in the user data. The write routine 151 further includes a process of writing the ECC data, thus generated, to the user data area 111 of the FeRAM 11, together with the user data.

The read routine 152 includes a process of reading user data from the user data area 111 of the FeRAM 11 when the host interface 13 receives from the host the transfer request (i.e., read command) for the transfer of the user data. The read routine 152 further includes a process of generating ECC data before the user data is read from the FeRAM 11. This ECC data is used to check for and correct any error in the block address data representing the block address of the block 20 that holds the requested user data. Further, the read routine 152 includes a process of writing the generated ECC data to the block address area 112 of the FeRAM 11, in association with the block address data, and a process of transferring the requested user data to the host.

The error checking and correction routine 153 is included in the initialization routine that initializes the storage apparatus 10. The initialization routine is executed when the supply of power to the storage apparatus 10 is started. The error checking and correction routine 153 includes a process of checking for and correcting any error in the block address data stored in the block address area 112. The error checking and correction routine 153 further includes a process of checking for and correcting any error in the block data (user data). This block data is stored in the block 20 stored in the user data area 111 and designated by the block address data.

Figure 2:
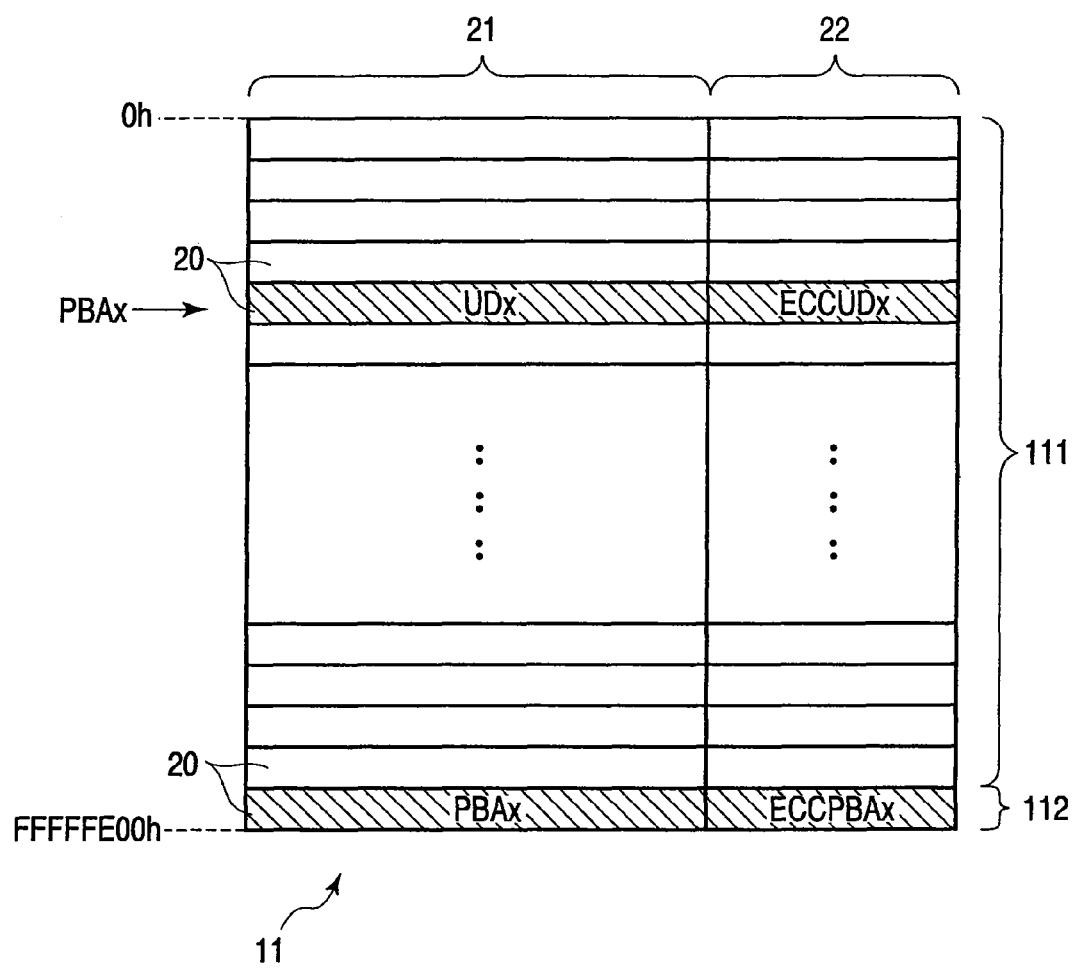
FIG. 2 is a diagram showing an exemplary format of the storage area of the FeRAM shown in FIG. 1.

FIG. 2 shows an exemplary format of the storage area of the FeRAM 11 shown in FIG. 1. The storage area of the FeRAM 11 is managed, block by block. Each block 20 is designated by the block address (physical block address) specific to it. Thus, the user data area 111 and block address area 112 provided in the FeRAM 11 can be accessed, at least in units of blocks 20, when the block addresses are designated.

A part of the storage area of the FeRAM 11 is allocated to the user data area 111. Another part (e.g., part other than the of the user data area 111) of the storage area of the FeRAM 11 is allocated to the block address area 112. In this embodiment, the user data area 111 is composed of a plurality of blocks 20, and the block address area 112 is composed of one block 20.

Each block 20 is composed of a set of two sections, i.e., data section 21 and error checking and correction data section (hereinafter called the ECC data section) 22. The data section 21 and ECC data section 22 that constitute each block 20 in the user data area 111 are used to store, respectively, user data and ECC data (i.e., ECC data for checking for and correcting an error in the user data). In the case of FIG. 2, block data composed of user data UDx and ECC data ECCUDx is stored in the block 20 in the user data area 111, which is designated by block address PBAx.

The data section 21 and ECC data section, which constitute the block 20 in the block address area 112, are used to store, respectively, the block address data and the ECC data (i.e., ECC data for checking for and correcting an error in the block address data). In the case of FIG. 2, block data composed of block address data PBAx and ECC data ECCPSBAx is stored in the block 20 in the block address area 112.

Figure 3:
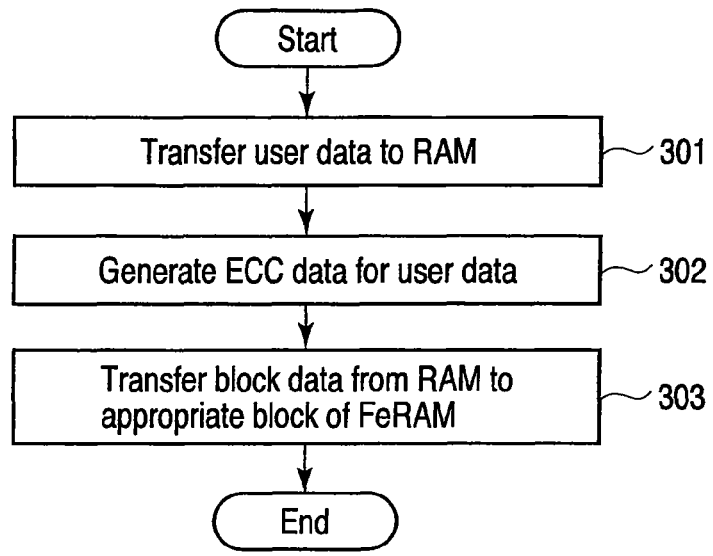
FIG. 3 is a flowchart showing an exemplary sequence of the write process performed in the embodiment.

How the storage apparatus 10 shown in FIG. 1 operates to perform, for example, a write process will be explained with reference to the flowchart of FIG. 3. Assume that the host issues a write command to the storage apparatus 10, causing the apparatus 10 to write the user data UDx. In the storage apparatus 10, the host interface 13 receives the write command from the host and transfers the write command to the MPU 16. In the meantime, the host transfers to the storage apparatus 10 the user data UDx that will be used to perform the write process designated by the write command. The user data UDx transferred from the host is received by the host interface 13 of the storage apparatus 10.

The write command issued from the host includes start address (start logic address) and size data. The start address represents the position in the logic address space at which the data writing should be started. The size data represents the size of the data to be written. From the start address and the size data, the end address (end logic address) representing the position at which the data writing should be ended can be calculated. In this embodiment, the start address and the end address are assumed to represent the start boundary and end boundary of one logic block, respectively, for simplicity of explanation.

Also assume that the logic block address the start address represents is LBAx, which means that the write command from the host designates data writing to the logic block (hereinafter called logic block LBAx) designated by the logic block address LBAx. Further assume that the address translation table stored in the address translation table area 122 holds the physical block address PBAx associated with the logic block address LBAx.

Once the MPU 16 receives a write command from the host via the host interface 13, it starts functioning as a write module in accordance with the write routine 151 included in the program 150. The MPU 16 therefore performs a write process whose sequence is shown in the flowchart of FIG. 3, as will be explained below.

First, the MPU 16 transfers the user data UDx (for example, one-block user data) the host interface 13 has received from the host, to the RAM 12. The user data UDx is stored at a prescribed first location in the work area 121 of the RAM 12 (Block 301). In this embodiment, the write module includes a first error-checking-and-correction-data generation module. The MPU 16 functions as the first error-checking-and-correction-data generation module. Therefore, the MPU 16 generates ECC data ECCUDx for use in checking for and correcting an error in the user data UDx, at a prescribed second location in the work area 121, through calculation based on the user data UDx (Block 302).

Various methods of checking for and correcting errors, which can be used to generate the ECC data ECCDx, have been hitherto known. Hence, how the ECC data ECCDx is generated in this embodiment will not be explained here. Thus, the first error-checking-and-correction data-generation module can be provided in the form of hardware.

Next, the MPU 16 transfers to the FeRAM 11 via the nonvolatile memory interface 14 the block data that is composed of the user data UDx and ECC data ECCUDx stored at the prescribed first and second locations in the work area 121, respectively (Block 303). The block 20 in which this block data is stored is a block having block address PBAx. In Block 303, the MPU 16 stores the block data transferred to the FeRAM 11, in the block 20 (storage location) which is designated by an appropriate block address (physical address) PBAx and which exists in the user data area 111 of the FeRAM 11.

As indicated above, the block address (physical block address) PBAx is held in the address translation table stored in the address translation table area 122 of the RAM 12, in association with the logic block address LBAx. The MPU 16 can therefore translate the logic block address LBAx to the block address (physical block address) PBAx by referring to the address translation table.

How the storage apparatus 10 operates to perform a read process will be explained with reference to the flowchart of FIG. 4. Assume that the host issues a read command to the storage apparatus 10, instructing the apparatus 10 to read user data. The read command includes the start address (start logic address) representing the position in the logic address space, at which to start reading data, and size data representing the size of the data to be read. Here it is assumed that the read command from the host designates the data reading from the logic block LBAx designated by the logic block address LBAx.

In the storage apparatus 10, the host interface 13 receives the read command from the host. The read command is transferred to the MPU 16. On receiving the read command from the host through the host interface 13, the MPU 16 functions as a read module in accordance with the read routine 152 included in the program 150. Thus, the MPU 16 performs the read process whose sequence is shown in the flowchart of FIG. 4, as will be explained blow.

First, the MPU 16 translates the logic block address LBAx to a physical block address, by referring to the address translation table stored in the address translation table area 122 of the RAM 12. Here it is assumed that the logic block address LBAx is translated to the physical block address PBAx. The physical block address PBAx designates the block 20 in the user data area 111 of the FeRAM 11, which stores the user data to be read.

The MPU 16 then transfers, to the RAM 12, the block address data (hereinafter called block address data PBAx) that represents the physical block address PBAx. The block address data PBAx is thereby stored at the prescribed first location in the work area 121 of the RAM 12 (Block 401). In this embodiment, the read module includes a second error-checking-and-correction data-generation module. The MPU 16 functions as the second error-checking-and-correction-data generation module. Therefore, the MPU 16 generates ECC data ECCPBAx for use in checking for and correcting an error in the block address data PBAx, at a prescribed second location in the work area 121, by performing a calculation based on the block address data PBAx (Block 402). Note that the ECC data ECCPBAx may be generated by hardware. That is, the second error-checking-and-correction-data generation module may be provided in the form of hardware.

Next, the MPU 16 transfers to the FeRAM 11 via the nonvolatile memory interface 14 the block data that is composed of the block address data PBAx stored at the prescribed first location in the work area 121 and the ECC data ECCPBAx generated at the prescribed second location in the work area 121 (Block 403). In Block 403, the MPU 16 stores the block data in the block address area 112 of the FeRAM 11.

Then, the MPU 16 reads via the nonvolatile memory interface 14 the data of the block 20 designated by the block address (physical block address) PBAx and stored in the user data area 111 of the FeRAM 11 (Block 404). The block 20 thus read is a block having the block address PBAx. In Block 404, the MPU 16 transfers to the RAM 12 at least the user data (user data UDx) included in the data read and designated by the read command from the host. This user data is stored in the RAM 12. The MPU 16 then transfers the user data (i.e., data to be read), now stored in the RAM 12, to the host (Block 405).

Figure 5:
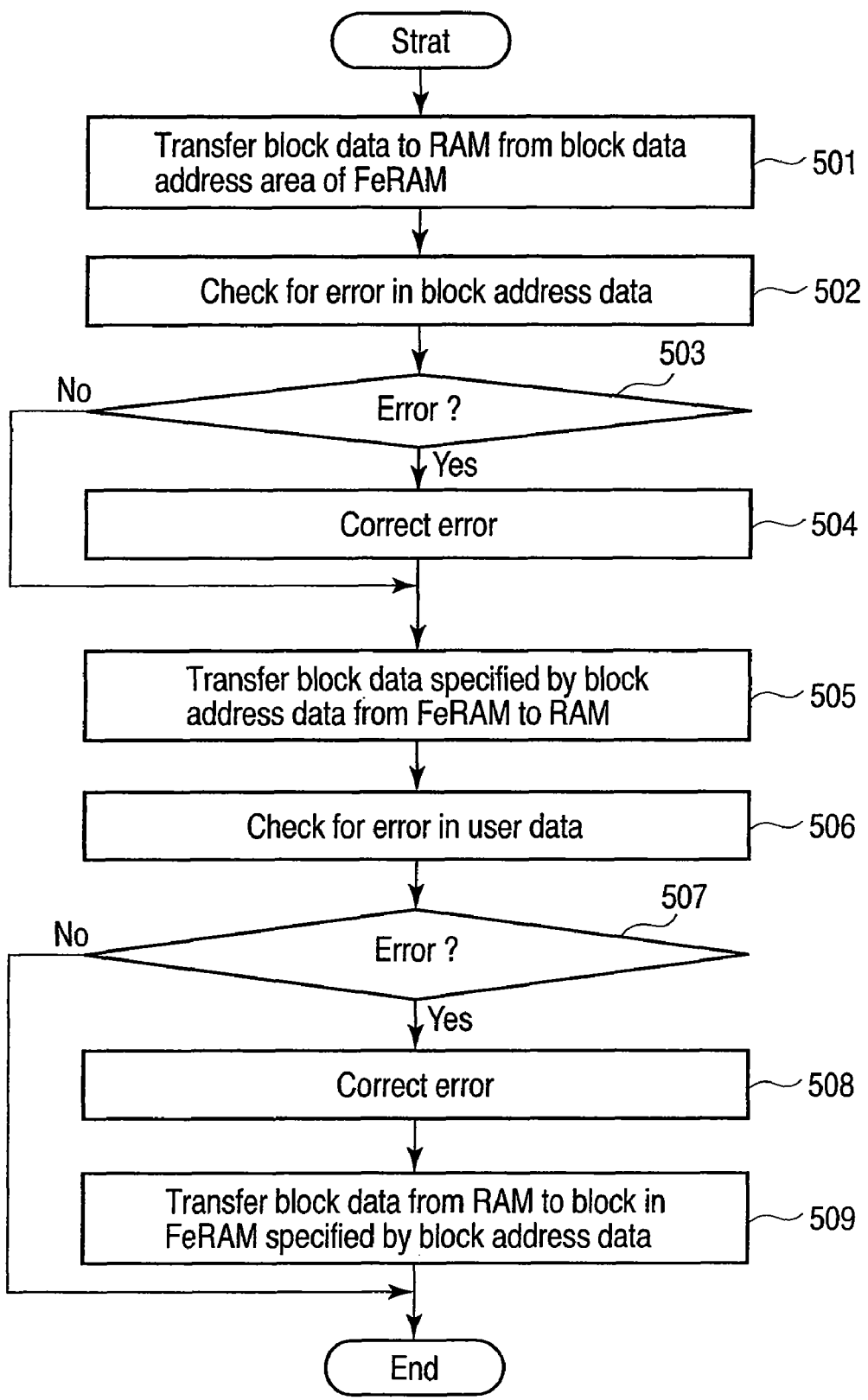
FIG. 5 is a flowchart showing an exemplary sequence of the error checking and correction process performed in the embodiment after the supply of power is started.

How the storage apparatus 10 shown in FIG. 1 operates to perform an error checking and correction process in the initialization process performed after the supply of power is started will be explained with reference to the flowchart of FIG. 5. Assume that the supply of power is unexpectedly interrupted while the user data UDx at the block address PBAx is being read from the user data area 111 during, for example, the read process of Block 404, and that the supply of power is restored.

When the supply of power is restored, the MPU 16 performs an initialization process in accordance with the initialization routine included in the program 150. The initialization routine includes an error checking and correction routine 153. In accordance with the error checking and correction routine 153, the MPU 16 functions as an error checking and correction module. Thus, the CPU 16 performs the error checking and correction process whose sequence is shown in the flowchart of FIG. 5, as will be explained below.

First, the MPU 16 reads block data via the nonvolatile memory interface 14 from the block address area 112 of the FeRAM 11 and transfers the block data to the RAM 12 (Block 501). In Block 501, the MPU 16 stores the block data in the work area 121 of the RAM 12. The block data thus stored is the data stored in the block address 112 of the FeRAM 11 during the last read process performed (in Block 403) before the supply of power is started this time. Assume that the block data is composed of block address data PBAx and ECC data ECCPBAx.

The MPU 16 performs an error checking process to check for or detect an error in the block address data PBAx, on the basis of the block address data PBAx and ECC data ECCPBAx constituting the block data stored in the work area 121 in Block 501 (Block 502). The MPU 16 then determines whether an error has been detected in the block address data PBAx (Block 503).

If an error is detected in the block address data PBAx (Yes in Block 503), the MPU 16 corrects the error in the block address data PBAx in accordance with the ECC data ECCPBAx (Block 504). Then, the MPU 16 goes to Block 505. If no error is detected in the block address data PBAx (No in Block 503), the MPU 16 skips Block 504, going to Block 505.

In Block 505, based on the block address data PBAx, which has been error-corrected or in which no error has been detected, the MPU 16 reads, through the nonvolatile memory interface 14, the block data (i.e., block data at the block address PBAx) from the block 20 which is stored in the user data area 111 of the FeRAM 11 and which is designated by the block address (physical address) PBAx represented by the block address data PBAx. The MPU 16 transfers the block data, thus read, to the RAM 12 and stores the block data in the work area 121 of the RAM 12. The block data read is composed of user data UDx and ECC data ECCUDx.

Next, the MPU 16 performs an error checking process to check for or detect an error in the user data UDx, on the basis of the user data UDx and ECC data ECCUDx included in the block data that are stored in the work area 121 of the RAM 12 (Block 506). The MPU 16 determines whether an error has been detected in the user data UDx (Block 507). If any error is detected in the user data UDx (Yes in Block 507), the MPU 16 corrects the error in the user data UDx in accordance with the ECC data ECCUDx (Block 508).

The MPU 16 then transfers the block data composed of the user data UDx and ECC data ECCUDx, which have been error-corrected, to the FeRAM 11 via the nonvolatile memory interface 14 (Block 509). In Block 509, the MPU 16 writes the block data back into the block 20 (i.e., block 20 at the block address PBAx) in the user data area 111 of the FeRAM 11. The user data UDx included in the block data stored in the block 20 at the block address PBAx is thereby restored as correct data.

On performing Block 509, the MPU 16 completes the error checking and correction process performed in the initialization process that is performed after the supply of power has been started. On the other hand, no error may be detected in the user data UDx (that is, No in Block 507). In this case, the MPU 16 terminates the error checking and correction process.

Figure 4:
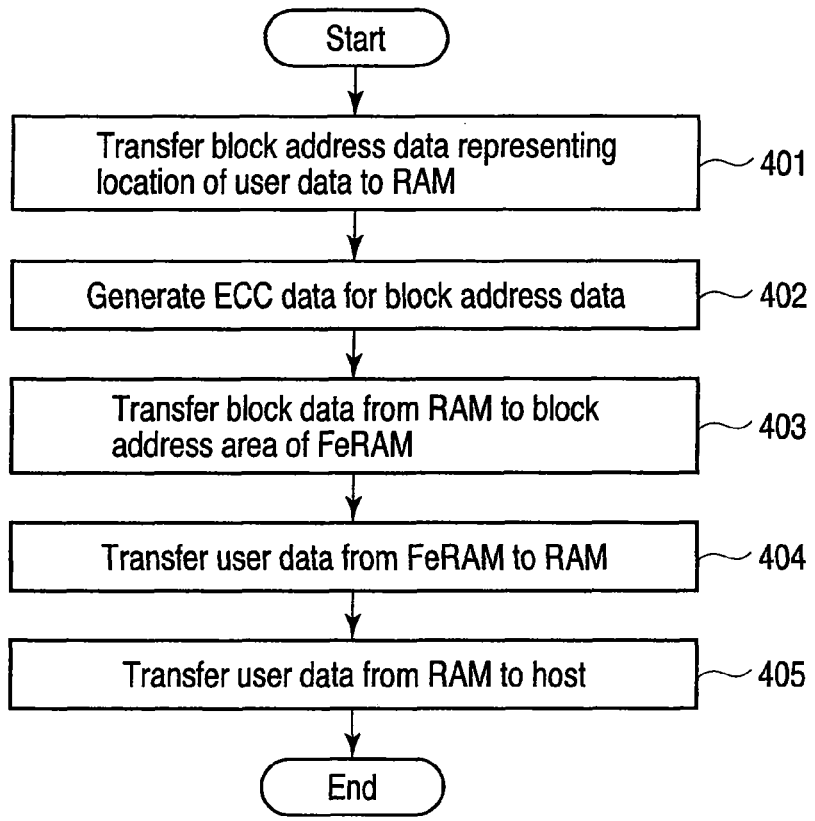
FIG. 4 is a flowchart showing an exemplary sequence of the read process performed in the embodiment.

As indicated above, in this embodiment, the user data UDx included in the block data at the block address PBAx is read in Block 404 of the read process shown in the flowchart of FIG. 4. While Block 404 is being performed, the power supply to the storage apparatus 10 may be unexpectedly interrupted. In this event, a part of the user data UDx may be lost. In Block 404, however, the ECC data ECCUDx included in the block data at the block address PBAx is not read. Therefore, no parts of the ECC data ECCUDx will be lost even if the power supply to the storage apparatus 10 is interrupted.

In this embodiment, Block 403 is performed prior to Block 404. The block data composed of the block address data PBAx, which represents the block address PBAx, and the ECC data ECCPBAx is thereby stored in the block address area 112. Hence, the MPU 16 can specify the block address PBAx of the block data including the user data UDx that may be lost in part if the supply of power is unexpectedly interrupted, in the error checking and correction process shown in the flowchart of FIG. 5 (Block 501). As pointed out above, the error checking and correction process is performed when the supply of power is restored after being unexpectedly interrupted.

The MPU 16 can read the block data at the block address PBAx from the FeRAM 11 (Block 505), by designating the block address PBAx. Moreover, the MPU 16 can immediately detect and correct any error, if any, in the user data UDx included in the block data thus read, on the basis of the ECC data ECCUDx included in the block data. Therefore, the MPU 16 can correct the error at high speed to restore the user data UDx, without the necessity of using a special non-destructive-read hardware configuration as in the conventional storage apparatus.

Moreover, the above-mentioned error checking and correction process needs to be performed only once after the supply of power has been started. This embodiment can therefore reduce the power consumption in the storage apparatus 10, unlike the conventional technique in which the error checking and correction process must be performed every time the user data is read from the storage apparatus. Further, in this embodiment, the transfer of data can be prevented from being delayed in the process of reading data from the FeRAM 11 (more precisely, from the user data area 111 of the FeRAM 11). Moreover, in this embodiment, the above-mentioned error checking and correction process is performed in the initialization process that is performed after the supply of power has been started. Hence, no corrupt parts resulting from the unexpected interruption of the power supply will remain in the data when a read command from the host is executed. This helps to enhance the reliability of data.

A cache memory area may be provided in the RAM to temporarily store the user data read from the user data area of the FeRAM 11 in response to a read command issued from the host. If the storage apparatus 10 is so configured, providing such a cache memory area, the user data specified by the read command from the host will be immediately read from the cache memory area and transferred to the host if it is stored in the cache memory area of the RAM 12.

Further, the user data stored in the physical block at the logic block address that follows the logic block address designated by a read command issued from the host may be read beforehand into the cache memory area as the MPU 16 performs a read cache process. In reading the user data beforehand, the MPU 16 should better perform a process equivalent to the process shown in the flowchart of FIG. 4. The user data thus read into the cache memory area of the RAM 12 need not always be transferred to the host as in the read process performed in response to the read command from the host.

Still further, the generation of the ECC data (Block 302) during the write process and the generation of the ECC data (Block 402) during the read process may be performed by a hardware module (ECC data generation module). Similarly, the checking for and correction of the error in the block address data (Blocks 503 to 504) and the checking for and correction of the error in the user data (Blocks 506 to 508), during the error checking and correction process, may be performed by a hardware module (error checking and correction module).

[First Modification]

A first modification of the embodiment described above will be described. In the embodiment described above, the supply of power to the storage apparatus 10 is interrupted very rarely while the user data is being read in Block 404. While any process other than Block 404 is being performed or while no processes are being performed, the supply of power may be interrupted. In this case, the error checking and correction process shown in the flowchart of FIG. 5 need not always be performed when the supply of power is restored.

The first modification is characterized in that the error checking and correction process is not performed needlessly when the supply of power is restored if it is interrupted after the read process shown in the flowchart of FIG. 4 has proceeded at least to Block 404. The phase of "after the read process shown in the flowchart of FIG. 4 has proceeded at least to Block 404" also means "after Blocks 401 to 405 have all been performed."

Figure 6:
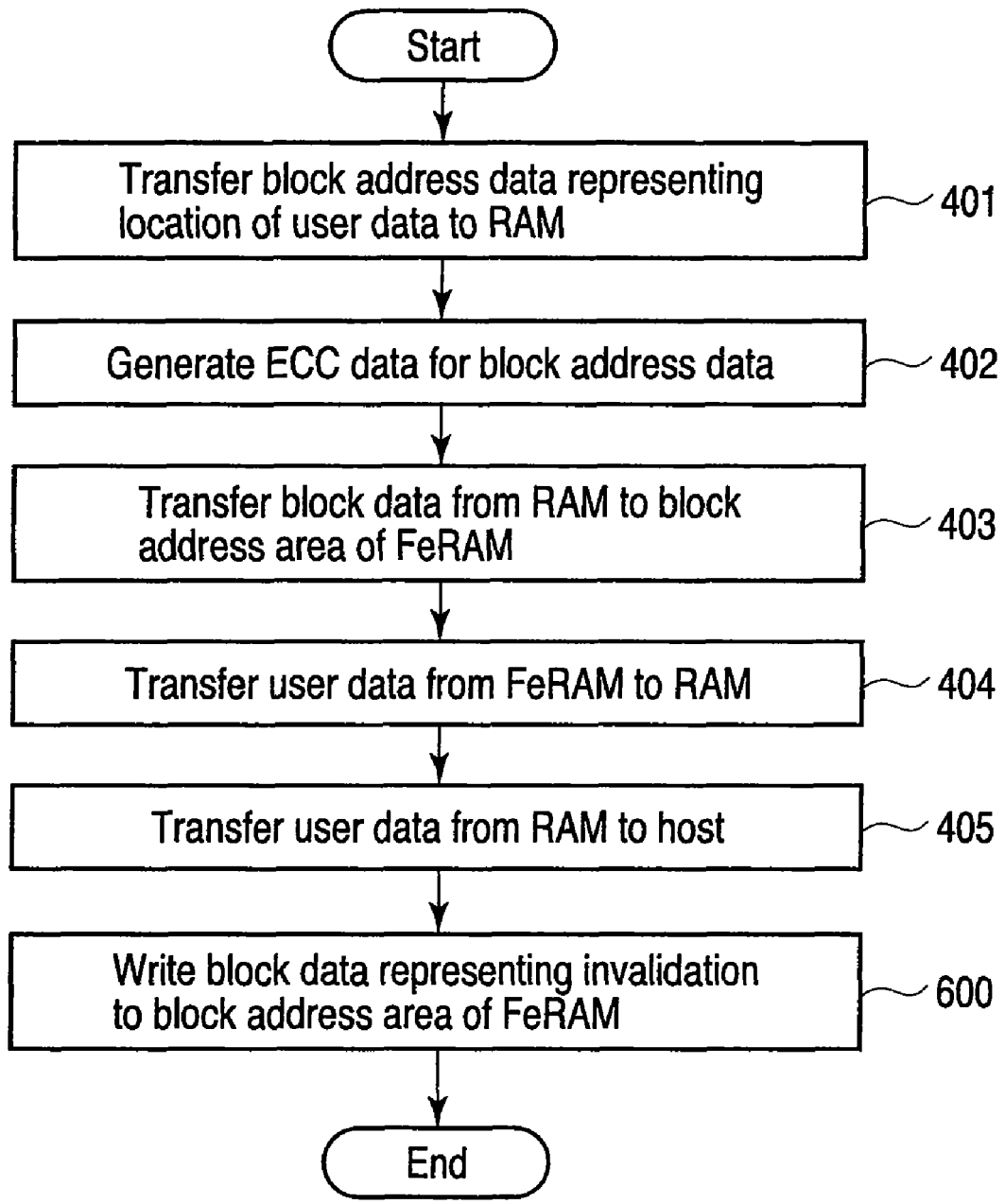
FIG. 6 is a flowchart showing an exemplary sequence of the read process performed in a first modification of the embodiment.
Figure 7:
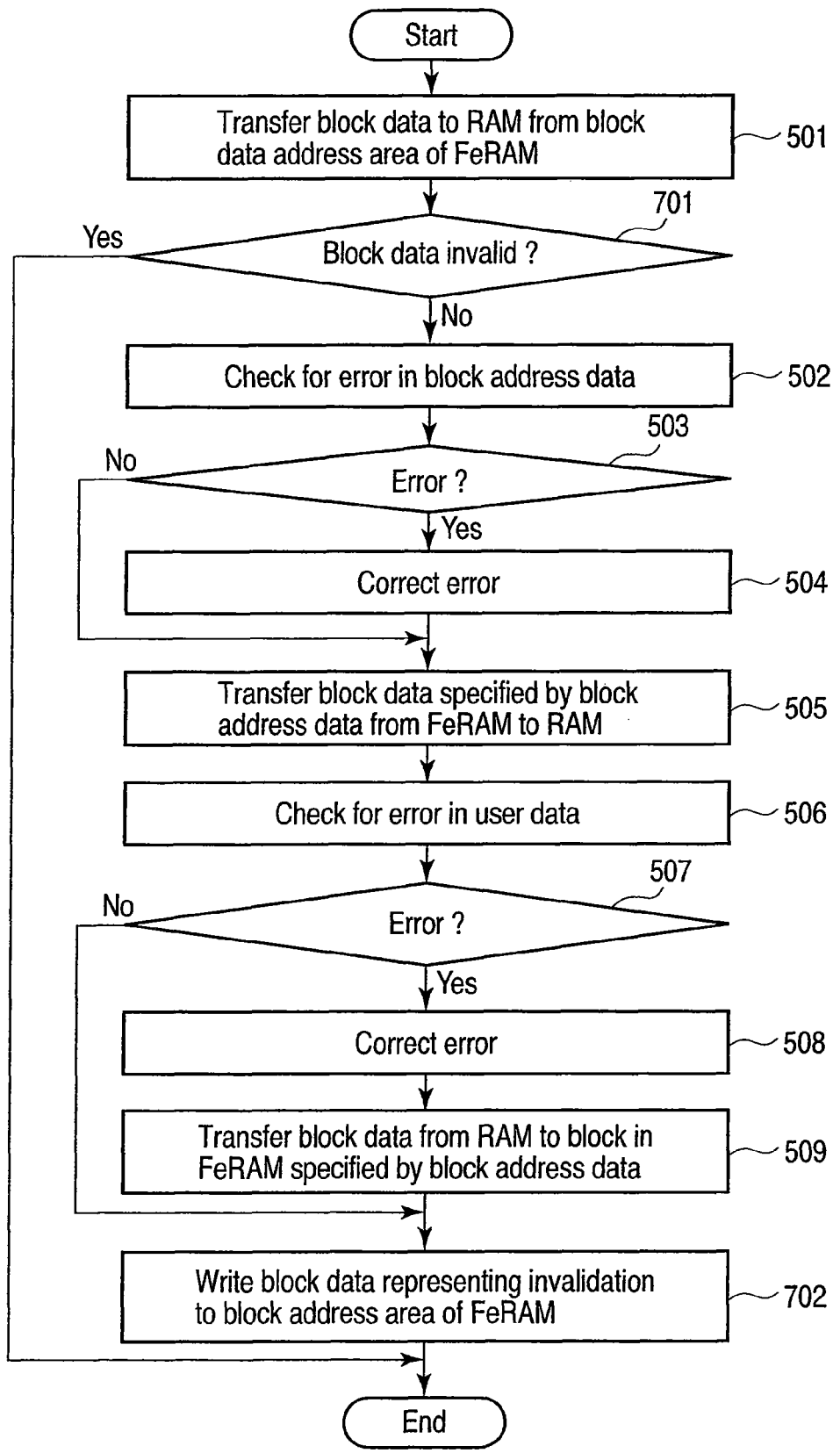
FIG. 7 is a flowchart showing an exemplary sequence of the error checking and correction process performed in the first modification of the embodiment after the supply of power is started.

The first modification and the embodiment described above differ in both the read process performed and the error checking and correction process that are performed in accordance with the read routine 152 and the error checking and correction routine 153, respectively. The read process and error checking and correction process, applied to the first modification, will therefore be explained with reference to the flowcharts of FIGS. 6 and 7, mainly on the points different form the embodiment. In FIGS. 6 and 7, the blocks equivalent to those shown in FIGS. 4 and 5 are designated by the same reference numbers.

In the read process shown in the flowchart of FIG. 6, Blocks 401 to 405 are first performed unless the supply of power to the storage apparatus 10 is unexpectedly interrupted, as in the embodiment described above. The MPU 16 writes block data representing invalidation (e.g., block data including invalid block address data) to the block address area 112 of the FeRAM 11 (Block 600). That is, the block data stored, in Block 403, in the block address area 112 (the block data composed of block address data PBAx and ECC data ECCP-BAx, in the case described above) is updated to block data that represents invalidation. As a result, the read process is terminated in the first modification. Note that Block 600 can be performed immediately after Block 404. In other words, Block 600 may be performed any time after Block 404, not necessarily at the end of the read process.

Next, Block 501 is performed in the error checking and correction process, which is shown in the flowchart of FIG. 7 and which is performed in the initialization process effected after the supply of power has been started. The block data stored in the block address area 112 of the FeRAM 11 is thereby read and stored in the work area 121 of the RAM 12.

The MPU 16 then determines whether the block data read from the block address area 112 is data representing invalidation (Block 701). (In this respect, the first modification differs from the embodiment described above.) If the block data represents invalidation (Yes in Block 701), the MPU 16 determines that data has been read, without being destroyed, in the last read process performed before the supply of power is started this time, or that data destroyed has been restored in the error checking and correction process previously performed. In this case, the MPU 16 terminates the error checking and correction process at once. Thus, the process (Blocks 502 to 509) is prevented from being performed needlessly.

On the other hand, the block data may not represent the invalidation (that is, No in Block 701). If this is the case, the MPU 16 determines that user data may have been destroyed, in part, due to an unexpected interruption of the supply of power during the last read process (more precisely, reading of user data executed in Block 404) performed before the supply of power is started this time. Then, the MPU 16 goes to Block 502. Thereafter, the same process as in the above-described embodiment is performed. If Yes in Block 507, Block 702 will be performed after Block 509 has been performed. By contrast, if No in Block 507, Block 702 is immediately performed.

In Block 702, the MPU 16 determines that the user data at the block address represented by the block address data included in the block data stored in the block address area 112 of the FeRAM 11 need not be corrected because this user data has already been corrected or has not been destroyed at all. The MPU 16 therefore updates, in Block 702, the block data stored in the block address area 112 to block data that represents invalidation.

[Second Modification]

Figure 8:
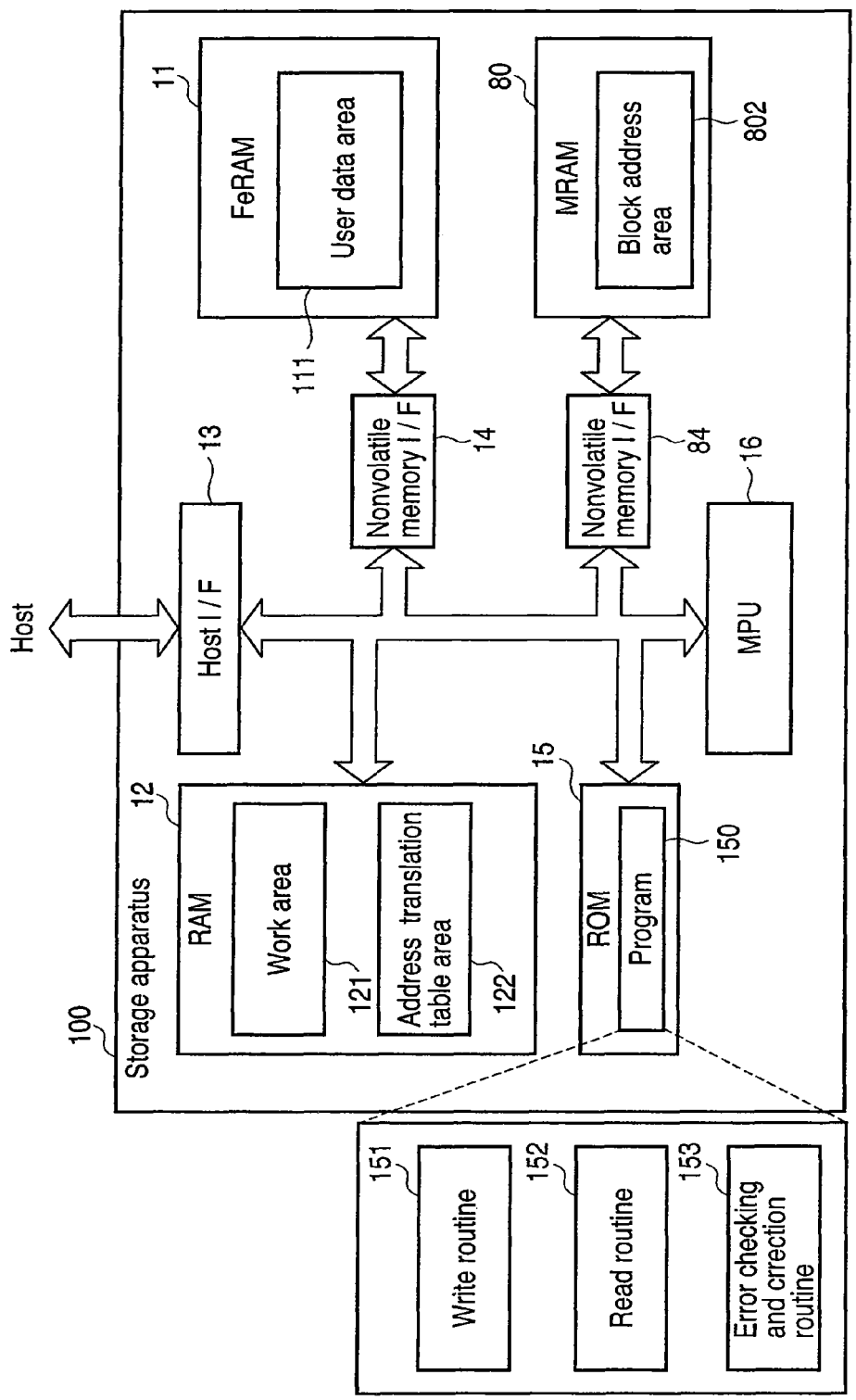
FIG. 8 is a block diagram showing an exemplary configuration of a storage apparatus according to a second modification of the embodiment.

A second modification of the embodiment described above will be described. FIG. 8 is a block diagram showing an exemplary configuration of a storage apparatus 100 according to the second modification of the embodiment. In FIG. 8, the components equivalent to those shown in FIG. 1 are designated by the same reference numbers.

As FIG. 8 shows, the storage apparatus 100 has a nonvolatile memory (second nonvolatile storage module), e.g., magnetoresistive RAM (MRAM) 80, which that undergoes no destructive read when data is read form it, in addition to the FeRAM 11. The storage area of the MRAM 80 includes a block address area 802. The block address area 802 is used in place of the block address area 112 of the FeRAM shown in FIG. 1. That is, the block address area 112 is not provided in the storage area of the FeRAM 11 in the storage apparatus 100 of FIG. 8. The MRAM 80 is accessed through a nonvolatile memory interface 84 that is equivalent to the nonvolatile memory interface 14 (see FIG. 1).

As evident from the configuration of the storage apparatus 100 shown in FIG. 8, the second modification is characterized in that the block address area 802 equivalent to the block address area 112 of the embodiment is provided in the MRAM 80 that is used in addition to the FeRAM 11. This configuration can enhance the reliability of the block address data stored in the block address area 802.

[Third Modification]

Figure 9:
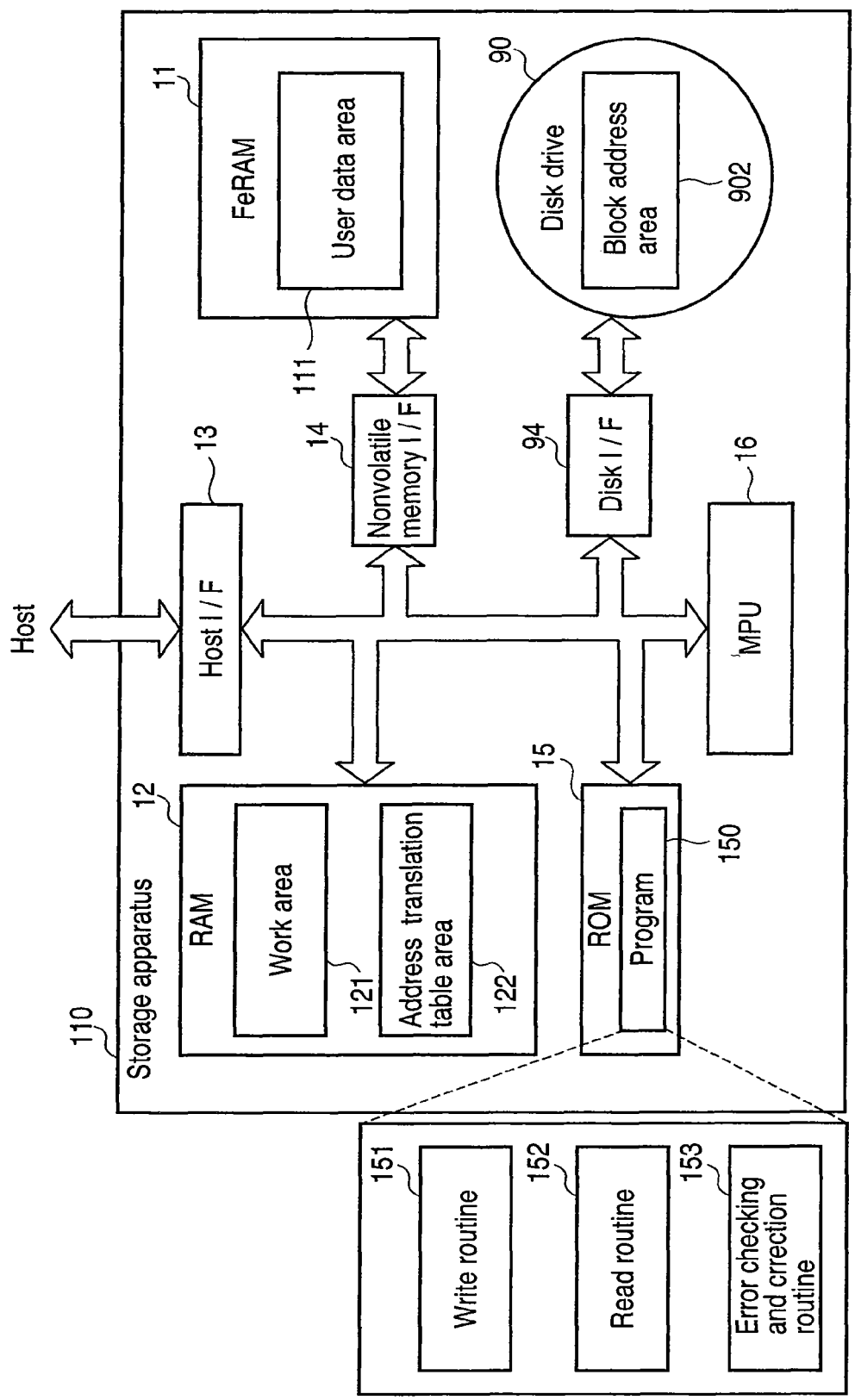
FIG. 9 is a block diagram showing an exemplary configuration of a storage apparatus according to a third modification of the embodiment.

A third modification of the embodiment described above will be described. FIG. 9 is a block diagram showing an exemplary configuration of a storage apparatus 110 according to the third modification of the embodiment. In FIG. 9, the components equivalent to those shown in FIG. 1 are designated by the same reference numbers.

The storage apparatus 110 of FIG. 9 has, in addition to the FeRAM 11, a disk drive 90 such as a magnetic disk drive. The disk drive 90 is a storage module (second nonvolatile storage module) that does not undergo a destructive read when data is read from it. The storage area of the disk drive 90 includes a block address area 902. The block address area 902 is used in place of the block address area 112 of the FeRAM 11 (FIG. 1). That is, no block address 112 is provided in the storage area of the FeRAM 11 in the storage apparatus 110 of FIG. 9. The disk drive 90 is accessed through a disk interface 94 that is equivalent to the nonvolatile memory interface 14 (see FIG. 1).

As seen from the configuration of the storage apparatus 110 shown in FIG. 9, the third modification of the embodiment is characterized in that the block address area 902 equivalent to the block address area 112 of the embodiment is provided in the disk drive 90 that is used in addition to the FeRAM 11. This configuration can enhance the reliability of the block address data stored in the block address area 902.

[Fourth Modification]

Figure 10:
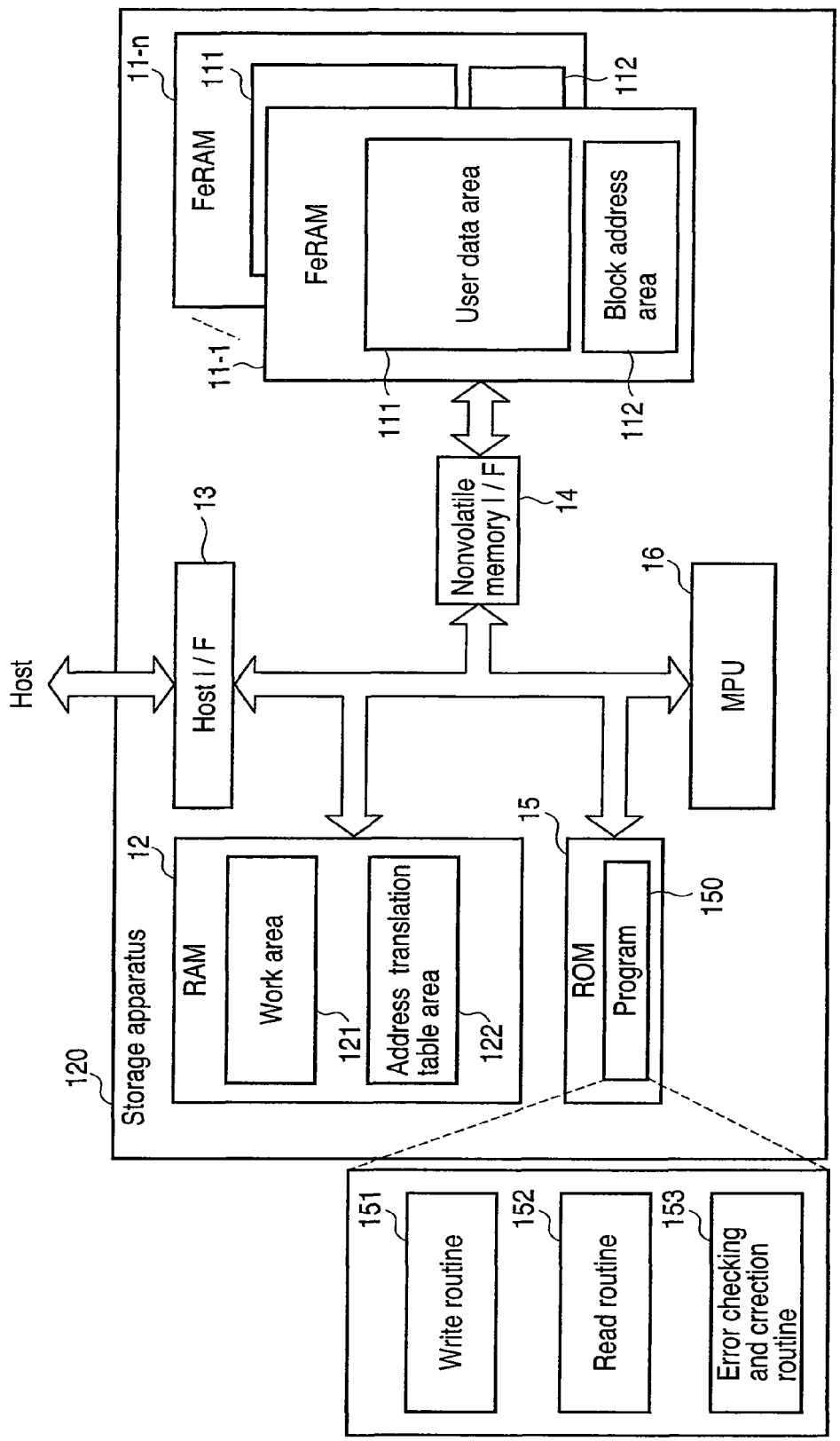
FIG. 10 is a block diagram showing an exemplary configuration of a storage apparatus according to a fourth modification of the embodiment.

A fourth modification of the embodiment described above will be described. FIG. 10 is a block diagram showing an exemplary configuration of a storage apparatus 120 according to the fourth modification of the embodiment. In FIG. 10, the components equivalent to those shown in FIG. 1 are designated by the same reference numbers.

The storage apparatus 120 of FIG. 10 has n FeRAMs 11-1 to 11-n, where n is an integer greater than 1. Each of the FeRAMs 11-1 to 11-n is equivalent to the FeRAM 11 shown in FIG. 1. Each FeRAM has a storage area that includes a user data area 111 and a block address area 112. The block address area 112 of each FeRAM 11-i (i=1, . . . n) is used to temporarily store the block address data representing the block address (physical block address) at which user data is stored, in the process of reading the user data from the user data area 111 of the FeRAM 110-i.

The MPU 16 incorporated in the storage apparatus 120 of FIG. 10 selects one of FeRAMs 11-1 to 11-n, in accordance with the read command issued from, for example, a host to initiate a read process. The MPU 16 reads data from the FeRAM thus selected. Note that only one of FeRAMs 11-1 to 11-n may have a block address area 112. In this case, it is sufficient to add ID data identifying the FeRAM selected, to the block address included in the block data stored in the block address area 112. Using this ID data, the MPU 16 can specify the FeRAM selected.

The configuration of FIG. 10 can be applied to the storage apparatus 100 of FIG. 8 and the storage apparatus 110 of FIG. 9. In other words, the storage apparatus 100 or the storage apparatus 110 may have a plurality of FeRAMs 11. In this case, it suffices to provide as many block address areas 802 or 902 as FeRAMs 11 in the storage area of the RAM 80 of the apparatus 100 or in the storage area of the disk drive 90 of the apparatus 110. Further, one block address area 802 may be provided in the storage area of the MRAM 80, or one block address area 902 may be provided in the storage area of the disk drive 90. In this case, it suffices to add ID data identifying the FeRAM selected, to the block address stored in the block address area 802 or 902.

Furthermore, an access may be made such that the start address (start logic address) and the end address (end logic address) may not represent the start boundary and end boundary of one logic block, respectively. In this case, the address (physical address) representing a storage location, too, in the block may be used in place of the block address included in the block data that is stored in the block address area 802 or 902.

The various modules of the storage apparatus described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A storage apparatus comprising:
    a first nonvolatile storage device configured to undergo a destructive read when data is read;
    a second nonvolatile storage device configured to store address data representing a storage location in the first nonvolatile storage device at which data to be read is stored;
    an error checking and correction module configured to check for and correct an error in data stored at the storage location in the first nonvolatile storage device which is represented by the address data stored in the second nonvolatile storage device, and configured to write the corrected data back into the first nonvolatile storage device; and
    a read module configured to read data from the first nonvolatile storage device and to store an address data representing a storage location of the data to be read, in the second nonvolatile storage device before the data is read from the first nonvolatile storage device,
    wherein:
    the read module is configured to update the address data stored in the second nonvolatile storage device to address data representing invalidation, after the data has been read; and
    the error checking and correction module is configured to disable error checking when the address data stored in the second nonvolatile storage device represents the invalidation.

2. The storage apparatus of claim 1, wherein the error checking and correction module is configured to operate when supply of power to the storage apparatus is started.

3. The storage apparatus of claim 1, wherein the error checking and correction module is configured to update the address data stored in the second nonvolatile storage device to address data representing the invalidation when an error is detected, after the corrected data has been written back into the first nonvolatile storage device.

4. The storage apparatus of claim 3, wherein the error checking and correction module is configured to update the address data stored in the second nonvolatile storage device to address data representing the invalidation when an error is not detected.

5. The storage apparatus of claim 1, further comprising:
    a first error-checking-and-correction-data generation module configured to generate first error-checking-and-correction data used to check for and correct an error in data to be written in the first nonvolatile storage device, on the basis of the data to be written; and
    a write module configured to write data in the first nonvolatile storage device, the first error-checking-and-correction data being added to the data written in the first nonvolatile storage device,
    wherein the error checking and correction module is configured to check for and correct an error in the data stored in the first nonvolatile storage device, on the basis of the first error-checking-and-correction data added to the data.

6. The storage apparatus of claim 5, further comprising a second error-checking-and-correction-data generation module is configured to generate a second error-checking-and-correction data to be used to check for and correct an error in address data to be stored in the second nonvolatile storage device, on the basis of the address data to be stored, wherein:

the read module is configured to add the second error-checking-and correction data to the address data when the read module stores the address data in the second nonvolatile storage device; and the error checking and correction module is configured to check for and correct an error in the address data stored in the second nonvolatile storage device, on the basis of the second error-checking-and-correction data added to the address data.

7. The storage apparatus of claim 1, wherein the second nonvolatile storage device is constituted by using a part of the storage area of the first nonvolatile storage device.

8. The storage apparatus of claim 1, wherein the second nonvolatile storage device is configured not to undergo a destructive read when data is read.

9. A method of checking for and correcting an error in data, for use in a storage apparatus comprising a first nonvolatile storage device, a second nonvolatile storage device, a read module and an error checking and correction module, the first nonvolatile storage device being configured to undergo destruction when data is read, the method comprising:

storing, in the second nonvolatile storage device by the read module, address data representing a storage location in the first nonvolatile storage device at which data to be read is stored;

reading, by the read module, the data stored in the storage location in the first nonvolatile storage device which is represented by the address data, after the address data is stored in the second nonvolatile storage device;

correcting, by the error checking and correction module, the data in which the error is detected;

writing, by the error checking and correction module, the corrected data back into the first nonvolatile storage device; and updating the address data stored in the second nonvolatile storage device to address data representing invalidation after the data is read from the storage location in the first nonvolatile storage device.

10. The method of claim 9, wherein the detecting is performed when power supply to the storage apparatus is started.

11. The method of claim 9, further comprising determining whether the address data represents invalidation before the detecting, wherein the detecting is disabled when the address data represents invalidation.

12. The method of claim 9, further comprising updating, after the corrected data is written back, the address data stored in the second nonvolatile storage device to address data representing invalidation, when the error is detected.

13. The method of claim 12, further comprising updating the address data stored in the second nonvolatile storage device to address data representing invalidation, when the error is not detected.

* * * * *